United States Patent [19]

MacLennan

[11] Patent Number: 5,058,477
[45] Date of Patent: Oct. 22, 1991

[54] SAW TOOTH AND HOLDER

[76] Inventor: Charles D. MacLennan, 153 Cote St-Charles, Hudson Height, Quebec, Canada, J0P 1J0

[21] Appl. No.: 623,321

[22] Filed: Dec. 6, 1990

Related U.S. Application Data

[63] Continuation-in-part of Ser. No. 578,165, Sep. 6, 1990, which is a continuation-in-part of Ser. No. 469,853, Jan. 23, 1990, abandoned.

[51] Int. Cl.⁵ ............................................. B27B 33/08
[52] U.S. Cl. ...................................................... 83/839
[58] Field of Search .................... 83/838, 839, 840–847

[56] References Cited

U.S. PATENT DOCUMENTS 3,818,561  6/1974  Montana ............................... 83/840
4,744,278  5/1988  Wright ................................. 83/839
4,750,396  6/1988  Gaddis et al. ....................... 83/839

*Primary Examiner*—Mark Rosenbaum
*Assistant Examiner*—Scott A. Smith
*Attorney, Agent, or Firm*—Diller, Ramik & Wight

[57] ABSTRACT

A circular saw is provided with a disc and tooth holders mounted on the periphery of the disc, with each tooth holder having a pair of legs straddling the disc and fasteners such as bolts and nuts extending through the legs and discs for fastening the holder to the disc. A tooth head is provided with a shank in the form of a bolt which extends through the bore in the holder engaging the tooth head, and the shank and tooth head extend in a tangential axis with the periphery of the disc. Shoulders and platforms are provided on the body of the holder for abutting the tooth head.

2 Claims, 3 Drawing Sheets

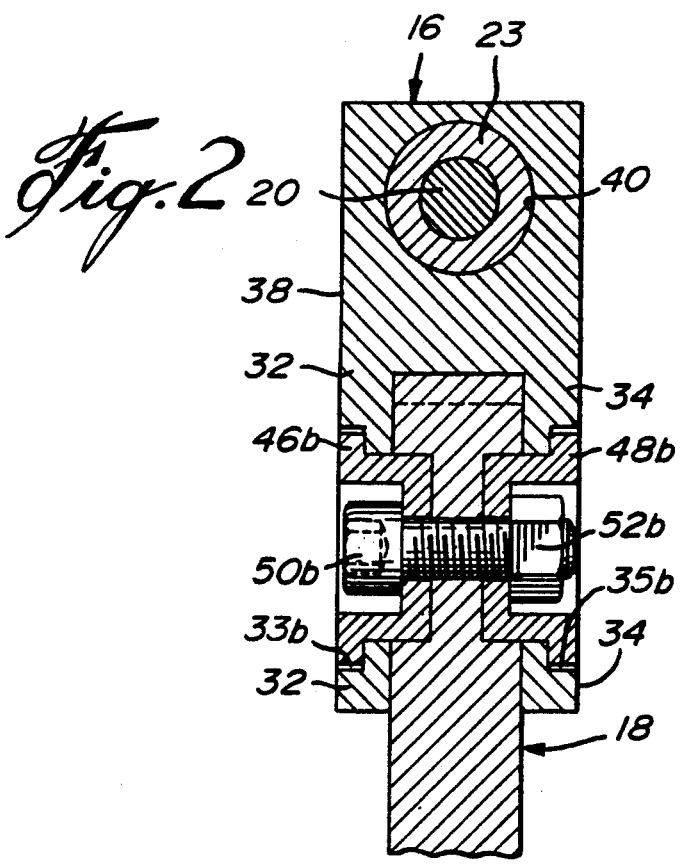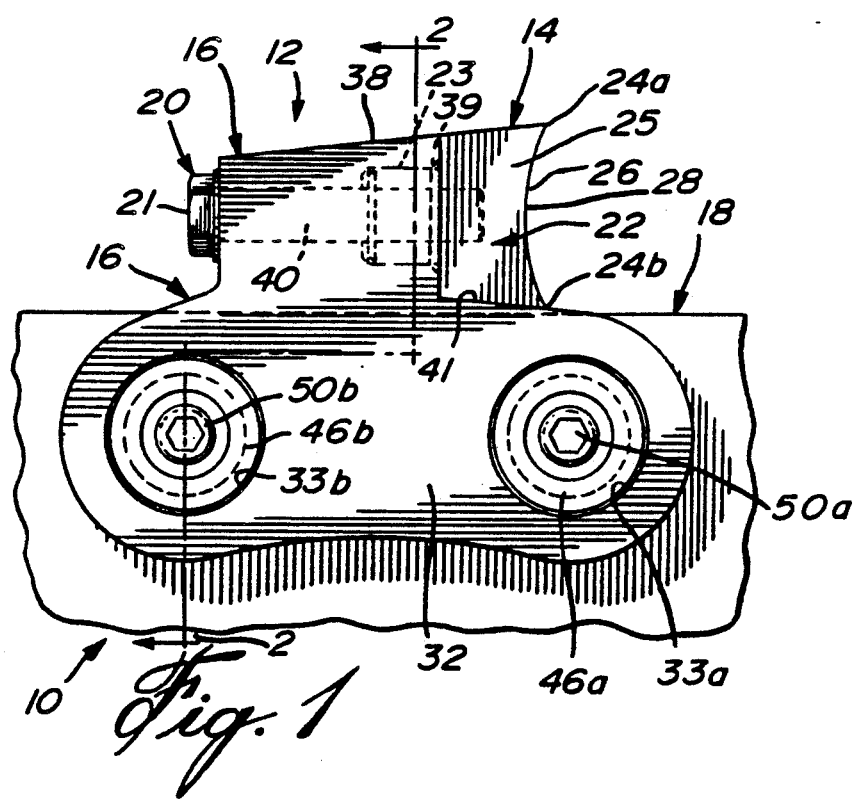

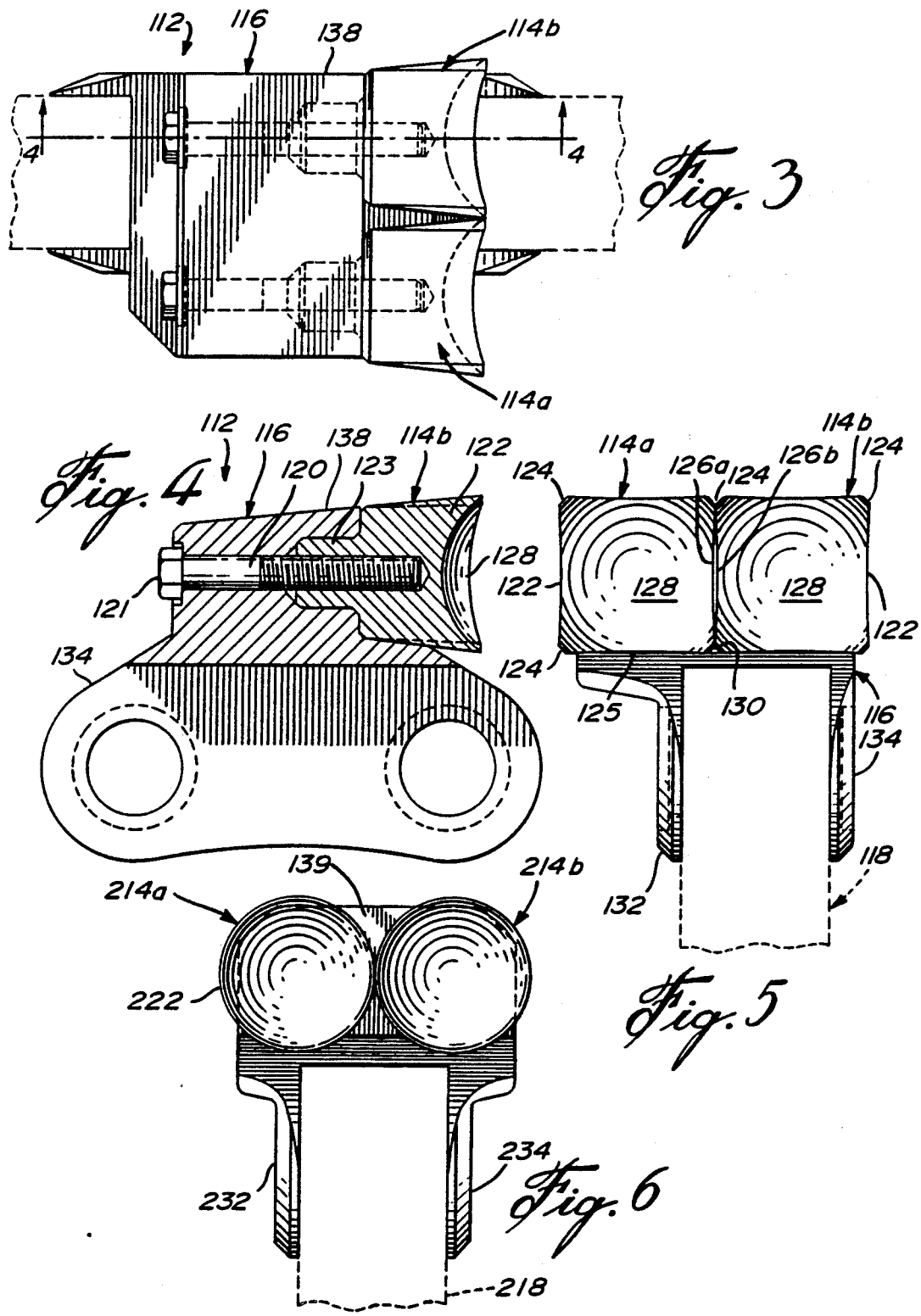

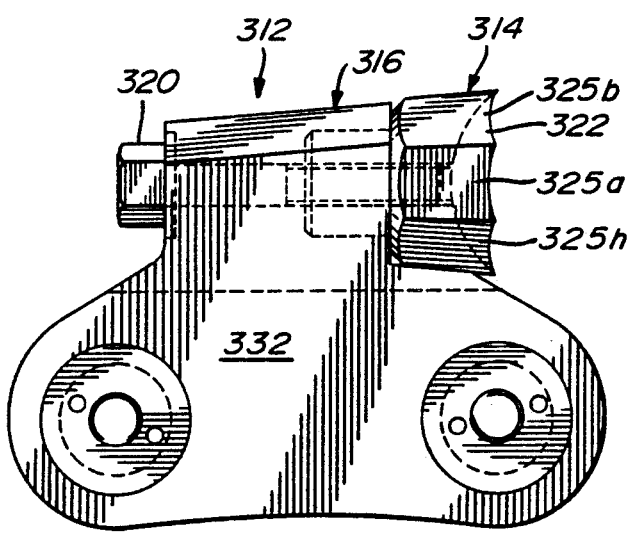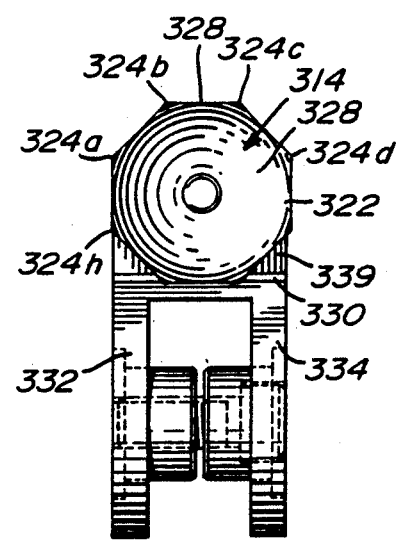
Fig. 7  Fig. 8
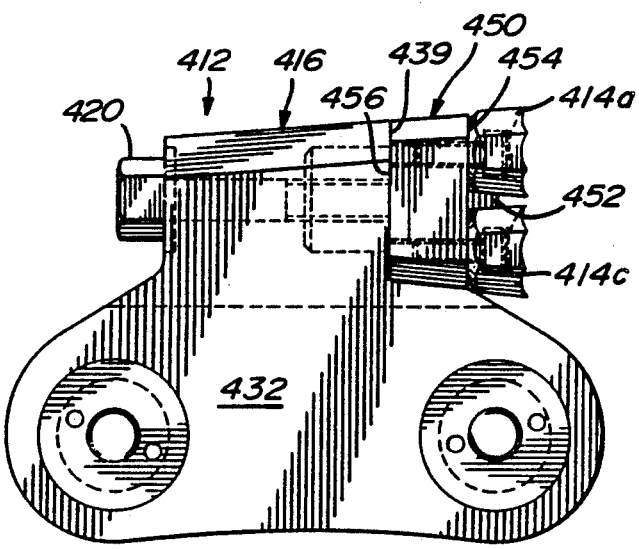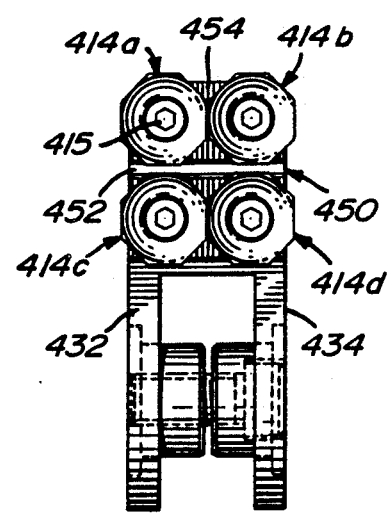
Fig. 9  Fig. 10

SAW TOOTH AND HOLDER

CROSS-REFERENCE TO RELATED APPLICATIONS

This application is a continuation-in-part application of application Ser. No. 578,165, filed Sept. 6, 1990 which is a continuation-in-part application of application Ser. No. 469,853, filed Jan. 23, 1990 now abandoned.

BACKGROUND OF THE INVENTION

1. Field of the Invention

The present invention relates to cutting saws, and more particularly, to a saw tooth insert and the means for mounting it to a saw.

2. Description of the Prior Art

It is now common to use circular saws on feller heads, for severing the trunk of a tree to be felled. Since the circular saw is made to rotate in a horizontal plane near the ground, when the feller head is in an operative position, it is not surprising that the teeth inserts on the periphery of the circular saw may be subject to severe shocks. In such situations, it is desirable to minimize the damage to the circular saw. It would be preferable to contain the damage to one tooth or only a few teeth which could then be easily replaced.

Most prior art circular saws include a circular disc with radial inserts mounted in gullets cut out in the discs. Thus, in the event that a tooth bit should strike an immovable object, such as a boulder, it is conceivable that the tooth and bit would be destroyed with the possibility of damage to the disc as well. The loads would, in most cases, be transmitted through the tooth shank sitting radially in the gullet, and thus to the disc. It is evident that such loads would be applied tangentially to the saw disc against the radially extending shanks. C-shaped teeth would also be faced with similar stresses causing probable damage to the disc.

U.S. Pat. No. 4,932,447, Morin, issued June 12, 1990, describes a circular saw having a square frusto-pyramidal head with a shank received in a holder in the form of a circular cylindrical tube welded to the periphery of the saw disc and a pin passing transversely through the holder and the shank to hold the tooth against rotation. The cutting edges and tips are formed by forming a concave spherical recess at the base of the pyramid. As set out in the patent, a feature is the possibility of rotating the tooth on its axis to present new pairs of tips and new cutting edges at the exterior when the tips and edges previously located at the cutting edge have lost their sharpness or have been damaged. There are some disadvantages to a square tooth. For instance, as admitted in the patent, the tips must be rounded in order to prevent breakage. On a square tooth, the tip is formed at the intersection of two walls at 90° and the spherical recess. This configuration makes for a very sharp tip, and one that is susceptible to breakage. The tooth as described in Morin includes a shank in a holder with a pin passing through the shank. Such an arrangement weakens the construction thereof. The circular saw in the feller environment is made to rotate in the 1000 r.p.m. range. Any sudden impact on the teeth, in the Morin construction, may cause a tooth to be dislodged. Given the high degree of centrifugal forces acting on the teeth, damage or injury might be caused if a tooth should break off.

SUMMARY OF THE INVENTION

It is an aim of the present invention to provide an improved replaceable saw tooth with a novel tooth holder for mounting the tooth on the substrate of the saw.

It is a further aim of the present invention to provide an improved circular saw with replaceable saw teeth on the periphery thereof mounted in such a way that gullets are not required in the circular saw disc.

It is a further aim of the present invention to provide an improved saw tooth insert and holder whereby the tooth insert may be rotated to extend the life thereof.

It is a still further aim of the present invention to provide an improved saw tooth having a frusto-pyramidal shape with a number of sides greater than four but a multiple of two so as to overcome some of the disadvantages of a four-sided saw tooth.

A construction in accordance with the present invention comprises a saw tooth and tooth holder combination for a cutting saw. The saw includes a substrate, and the tooth holder is formed as a clevis which straddles the substrate, each clevis holder including a U-shaped member having a pair of legs extending on either side of the substrate and having a body portion formed at the bight of the U-shaped member straddling the substrate. The body defines a bore, and the saw tooth includes a tooth head having a small end and divergent surfaces extending to a large end with a concave recess formed at the large end of the head and forming cutting edges at the intersection of the concave recess and the divergent surfaces. A shank extends within the bore and is attached to the head at the small end thereof. The body defines a tooth receiving seat including a platform and an abutment surface for receiving the head. The tooth including the tooth shank and head extends in a tangential axis to the substrate with the large end of the tooth head projecting in the direction of movement of the saw substrate. The legs define recesses into which cupped sleeves are provided, and a bolt and nut extends through the substrate to retain the cupped sleeves against the substrate and thereby retain the tooth holder in position on the substrate.

An advantage of the present construction is that the teeth and holders are mounted on the exterior of the disc. In the event that a tooth or several teeth should strike an immovable object, individual teeth and holders may be sheared from the disc or otherwise damaged, without transmitting damaging loads to the saw disc, and thus the remainder of the circular saw remains usable. The damaged teeth and holders can be replaced. Furthermore, it is contemplated to rotate the teeth in the holders in order to spread the wear and increase the life of such teeth.

In another aspect of the present invention, the saw tooth is a frusto-pyramid and contains more than four sides but a multiple of two. At the base of the pyramid, there is a concave recess forming the cutting edges at the intersections of the concave surface and the sides and cutting tips at the intersection of two adjacent sides and the concave recess.

In a preferred embodiment of the present invention, the frusto-pyramid is a regular eight-sided pyramid. The advantages of an octagonal or eight-sided pyramid are several. For one, an eight-sided pyramid presents several more rotations of the tooth in order to extend the life of the tooth. Furthermore, the angle contained by each tip, that is, where the sides intersect, is 135°, which is much greater than the 90° angle of a tip of a square tooth. The greater angle presents a stronger tip, one that does not have to be rounded off. Furthermore, when one considers that an edge, which is farthest from the disc, as the cutting edge, the edges on each side of the cutting tips diverge at 45° thereby increasing the cutting efficiency of the tooth as it knifes its way through the trunk of a tree. The continuous cutting edge of the tooth is not unlike the configuration of a bread knife.

In another aspect of the present invention, there is a saw tooth and tooth holder combination for a cutting saw, wherein the saw includes a substrate and the holder is adapted to be releasably fastened to the substrate. The holder includes a tooth receiving seat which includes a first platform surface and an abutment surface at an angle thereto formed in a body of the holder. Bore means extend in the body through the abutment surface, and at least a pair of teeth are mounted on the tooth seat in side-by-side relationship, with each tooth being identical and having a head including a small end and a large end with divergent surfaces therebetween. The small end is adapted to fit against the abutment surface, and the divergent surfaces are adapted to fit on the platform. Shank means pass through the respective bores to each head and are attached thereto. Each of the tooth heads includes a concave recess at the large end thereof and forms cutting edges at the intersections of the concave surface and the divergent surfaces, whereby each tooth is capable of being rotated about its axis to present exposed cutting edges.

In a still further aspect of the present invention, a set of four identical smaller teeth can be mounted in a single holder to replace a single tooth. A construction according to this aspect of the present invention would include a carrier having a front surface and a rear surface with the rear surface being smaller than the front surface and four diverging side walls between the surfaces. The carrier is adapted to be mounted on a tooth holder having a tooth receiving seat and a shank extending through a bore in the holder. The rear surface and a side wall are adapted to sit on the abutment surface and the platform of the tooth receiving seat. The front wall of the carrier presents tooth receiving seats for four small teeth wherein each tooth includes a stank adapted to extend in a respective bore in the carrier, and a tooth head is a frusto-pyramid with a polygonal base that is a multiple of two. The teeth adapted to be mounted in two rows with a platform extend from the front surface between the two rows. Each of the teeth is capable of rotation, and the carrier is capable of rotation to present exposed cutting edges.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary side elevation of a detail of the present invention;

FIG. 2 is a vertical cross-section taken along line 2—2 of FIG. 1;

FIG. 3 is a top plan view of another embodiment of the present invention;

FIG. 4 is a vertical cross-section taken along line 4—4 of FIG. 3;

FIG. 5 is an end elevation of a detail of the embodiment shown in FIG. 3;

FIG. 6 is an end elevation, similar to FIG. 5, but showing a further embodiment of the present invention;

FIG. 7 is a side elevation of another embodiment of the present invention;

FIG. 8 is a front elevation of the embodiment shown in FIG. 7;

FIG. 9 is a side elevation of a further embodiment of the present invention; and FIG. 10 is an end elevation of the embodiment shown in FIG. 9.

DESCRIPTION OF THE PREFERRED EMBODIMENTS

Referring now to the drawings, there is illustrated a fragment of a circular saw 10. A tooth assembly 12 is illustrated which includes a tooth 14 and a holder 16 adapted to be mounted on the disc 18.

Referring to FIGS. 1 and 2, the tooth assembly 12 includes a tooth 14 having a tooth head 22 which has a square frusto-pyramidal shape having a cutting face defining cutting tips 24a and 24b. The tooth head of the present embodiment is similar to that described in U.S. Pat. No. 4,932,447, granted to Armand J. Morin on June 12, 1990, and Canadian Patent 1,269,028, granted May 15, 1990.

The tooth head 22 has a concave recess 28 defining cutting edges 26. These cutting edges 26 are defined at the intersection of the concave recess 28 and the divergent side surfaces 25. The shank is in the form of a bolt 20 having a bolt head 21 and is adapted to pass through the bore 40 defined in the body 38 of the holder 16. The bolt threadably engages a collar 23 extending from head 22.

The holder 16 is in the form of a clevis and includes a pair of legs 32 and 34 saddled on either side of the disc 18 and two sets of stepped recesses 33a and 35a and 33b and 35b. Each set of stepped recesses, for instance, recesses 33b and 35b, as shown in FIG. 2, receive cups 46b and 48b. A nut and bolt arrangement 50a and 52a as well as 50b and 52b are provided to retain the cups on the disc 18 along with the legs 32 and 34 and, therefore, the holder 16 to the disc 18.

As can be seen from the construction of the holder 16, a tooth seat in the form of an abutment surface and a platform are provided to which the small end of the tooth head 22 will fit snugly. The loads transmitted through the tooth head 22 will be completely absorbed by the body 38 of the holder 16. The abutment surface is in the form of shoulder 39, and the platform is a flat sloped surface 41 which receives one of the pyramidal side walls 25 of the tooth head 22. When the tooth head 22 is snugly seated in the holder 16, the surface 41 will prevent the tooth 14 from rotating on its axis.

The mounting of the tooth 14 is such that the axis of the shank 20 and the tooth head 22 is tangential to the saw disc 18. It is understood that if the tooth head 22 were to strike an immovable object, such as a large boulder, the fastener represented by bolt 50 and nut 52 and the sleeves 46 and 48 might shear, allowing the tooth holder 16 and the tooth 14 to be blown away from the disc 18 before causing any damage to the remainder of the saw including the disc 18. Under normal operating circumstances, the impact received by the tooth head 22 will be absorbed by the tooth holder 16. If the tooth head 22 is damaged, it is merely replaced by removing the bolt 20.

In another embodiment as shown in FIGS. 3 to 6, like numerals have been raised by 100.

As shown in FIGS. 3 to 5, for instance, a pair of teeth 114a and 114b are mounted side by side with adjacent edges 126 in contact with each other. The holder 116 is offset, as shown in FIGS. 3 and 5, such that the tooth 114b is generally in the plane of the disc 118, and the tooth 114a is offset from the disc 118. The teeth 114a and 114b are identical to the tooth in FIG. 1, but of smaller dimensions. Concave recesses 128 are apparent from FIGS. 3 to 5 with the tips 124.

The teeth 114a and 114b can be made smaller than tooth 14 of FIG. 1, and thus may be cast individually at a much lower cost than the machining required to make a larger tooth out of stellite, for instance.

Each of the tooth heads 122 has a side surface 125 sitting on the platform 130 of the holder 116. The holder 116 also has an abutment surface 131 against which the tooth heads 122 abut when they are mounted on the holder by means of the bolts 120. When two teeth 114a and 114b are mounted on they can be individually rotated to present other tips 124 when the exposed tips have been worn through use. The provision of an offset holder along with the double teeth also provides a wider kerf coincident with the support plate on a feller (not shown), such that the freshly sawed trunk of the tree can easily slide onto the support plate. The offset portion of the holder 116 coincides with the thickness of the support plate generally.

In another embodiment as shown in FIG. 6, teeth 214a and 214b, each having frusto-conical tooth heads 222, replace the frusto-pyramidal teeth 114a and 114b.

Referring now to FIGS. 7 and 8 of the drawings, there is shown a tooth assembly 312 having a tooth holder 316 and clevis legs 332 and 334. The only difference between FIGS. 7 and 8 and FIG. 1, for instance, is the shape of the head 322 of the tooth 314. A bolt 320 passes through the body 316 of the holder 312 and engages a threaded opening in the shank part of the body 314 as previously described. The head 322 of the tooth 314 has an octagonal outline providing eight flat diverging side walls 325a to 325h which intersect with a concave recess 328 to define cutting edges 326 and cutting tips 324a to 324h. When the tooth 314 is mounted in the holder 316, a cutting edge 328 formed between tips 324b and 324c is exposed as the farthest from the substrate and which exposes the knifing edge. Tips 324b and 324c are formed at angles of 135° providing a strong sharp tip with concave cutting edges therebetween. As well, the cutting edges 328 formed between cutting tips 324a and 324b as well as 324c and 324d also help in the knifing action through the trunk of a tree, for instance. The octagonal edge can be rotated as the edge and the tips get worn. It is contemplated that a hexagonal head or a decagonal head can also be used. In order to always have a cutting edge parallel to the axis of rotation of the saw, it s necessary that the polygon outline of the head be a multiple of two.

In the embodiment shown in FIGS. 9 and 10, there is shown a carrying head 450 which is constructed somewhat in the same manner as the tooth head 22, but the front surface 454 of the head 450 is flat with a median projection 452 having converging surfaces extending across the front flat face 454. Bores are provided in the head 450, and individual small identical teeth 414a to 414d are set in the front surface of the head 450. As shown in the embodiment of FIGS. 9 and 10, the teeth 414a to 414d are octagonal in shape and are bolted from the front by means of bolts 415 threadably engaged in threaded openings provided in the head 450. The provision of four teeth, particularly octagonal teeth 414a to 414d, provides a much greater life to the tooth assembly by allowing not only for the rotation of the head 450 but also for the rotation of the individual teeth 414a to 414d.

I claim:

1. A tooth assembly for a cutting saw, wherein the tooth assembly includes a tooth holder to be releasably mounted on the periphery of the substrate, wherein the holder has a body, a bore extending through the body, a tooth seat including an abutment surface and a platform at an angle thereto with the bore extending to the abutment surface, and the axis of the bore being adapted to be at a tangent to the substrate, a tooth carrier including a tooth carrier head adapted to sit in the tooth seat on the holder, and a shank extending through the bore for retaining the tooth carrier on the holder, the tooth carrier including a frusto-pyramidal head having a small end abutting against the abutment surface, and a divergent side engaged against the platform, and a base surface, two pairs of bores extending through the head from the base surface, and a median platform member extending centrally of the base surface between the two rows of bores, small identical teeth with each tooth having a tooth head of a frusto-pyramid shape having a polygonal outline as a multiple of two, and a shank extending through the bore to engage each individual tooth to the tooth carrier against the abutting surface and a respective bore, each tooth having a concave recess intersecting the divergent side walls of the frusto-pyramid head to form cutting edges and cutting tips with adjacent sides of the head, and at least one divergent side of each head engaging the intermediate platform so as to prevent the teeth from rotation.

2. A tooth assembly as defined in claim 1, wherein each of the tooth heads has an octagonal outline.

* * * * *